United States Patent [19]

Toshihiko et al.

[11] Patent Number: 5,048,399
[45] Date of Patent: Sep. 17, 1991

[54] AIR INTAKE FOR AN AUTOMOTIVE AIR CONDITIONING SYSTEM

[75] Inventors: Fujita Toshihiko, Isesaki; Nakazawa Takeharu, Tamamura, both of Japan

[73] Assignee: Sanden Corporation, Gunma, Japan

[21] Appl. No.: 529,759

[22] Filed: May 29, 1990

Related U.S. Application Data

[63] Continuation of Ser. No. 299,351, Jan. 23, 1989, abandoned.

[30] Foreign Application Priority Data

Jan. 23, 1988 [JP] Japan .................. 63-6656[U]

[51] Int. Cl.⁵ .......................................... B60H 1/00
[52] U.S. Cl. ........................................ 98/2.01; 98/2.11
[58] Field of Search .......... 98/2, 2.01, 2.11, DIG. 8

[56] References Cited

U.S. PATENT DOCUMENTS

| | | |
|---|---|---|
| 4,223,720 | 9/1980 | d'Orsay et al. .............. 165/14 |
| 4,614,152 | 9/1986 | Fukasaku et al. |
| 4,779,672 | 10/1988 | Seikou et al. .............. 98/2.01 |

FOREIGN PATENT DOCUMENTS

| | | |
|---|---|---|
| 3020683 | 4/1980 | Fed. Rep. of Germany . |
| 2533865 | 10/1983 | France . |
| 56-34514 | 4/1981 | Japan .............................. 98/2 |
| 1119722 | 8/1965 | United Kingdom . |
| 2128322 | 4/1984 | United Kingdom . |

Primary Examiner—Harold Joyce
Attorney, Agent, or Firm—Banner, Birch, McKie & Beckett

[57] ABSTRACT

An air conditioning system for controlling the temperature in a passenger compartment in an automobile is provided. The air conditioning system includes a duct which defines an air passage and a blower disposed in the air passage for blowing air through the air passage. An outside air intake is formed in the duct for admitting air from outside the passenger compartment to the duct. First and second passenger compartment air intakes are formed in the duct for admitting air from the passenger compartment to the duct. A first damper selectively opens and closes the outside air intake and the first passenger compartment air intake in response to temperature control signals. A second damper opens and closes the second passenger compartment air intake in response to the speed of the blown air in the air passage. A damper control mechanism selectively controls the second damper such that the second passenger compartment air intake remains closed regardless of the speed of the blown air in the air passage.

9 Claims, 2 Drawing Sheets

AIR INTAKE FOR AN AUTOMOTIVE AIR CONDITIONING SYSTEM

This application is a continuation of application Ser. No. 299,351, filed Jan. 23, 1989, now abandoned.

BACKGROUND OF THE INVENTION

1. Technical Field

The present invention generally relates to an automotive air conditioning system and, more particularly, to an air intake for an automotive air conditioning system.

2. Description of the Prior Art

FIG. 1 illustrates a prior art automotive air conditioning system generally designated by the numeral 10. Air conditioning system 10 includes duct 12 which defines an air passage 13. The forward (or left as illustrated in FIG. 1) portion of duct 12 is a closed end formed by the gradual narrowing of duct 12. Outside air intake 14 and first passenger compartment air intake (first air intake) 15 are formed adjacent to the closed end of duct 12. Outside air intake 14 admits air from outside the automobile passenger compartment to duct 12. First air intake 15 admits air from the passenger compartment to duct 12. First damper 16 is disposed within duct 12. First damper 16 selectively controls the opening and closing of outside air intake 14 and first air intake 15 in response to air conditioning demand. Air conditioning demand may, for example, be determined by the setting of temperature control switches by a vehicle passenger. Blower 17 forces air from the forward to the rear (or right as illustrated in FIG. 1) portion of duct 12 and is positioned within air passage 13. Evaporator 18 and heater core 19 are disposed within air passage 13 and are positioned rearwardly of blower 17. First opening 111, second opening 112, and third opening 113 are formed at the rear portion of duct 12. First opening 111 directs blown air to defrost an automobile windshield (not shown). Second opening 112 directs blown air to the lower portion of footspace of the automobile passenger compartment. Third opening 113 directs blown air to the upper portion of the automobile passenger compartment.

Second passenger compartment air intake (second air intake) 20 is formed in a wall portion of duct 12 between first air intake 15 and blower 17. Second damper 21 is disposed within duct 12 and is adjacent to second air intake 20. Second damper 21 is a dead load-type damper, i.e., second damper 21 closes second passenger compartment air intake 20 by virtue of its weight. However, when air flows in duct 12, damper 21 is subjected to a force tending to counter the dead-load weight. When the speed of blown air in duct 12 exceeds a predetermined value, second air intake 20 is opened due to the movement of second damper 21, as illustrated in FIG. 1. Thus, second air intake 20 admits additional air from the passenger compartment to duct 12.

When blower 17 is operated, outside air or air from the passenger compartment is admitted to duct 12 depending on the position of first damper 16. the air flows through evaporation 18 and heater core 19 and is heated or cooled in response to the desired temperature of the passenger compartment. Finally, the air is directed through first opening 11, and/or second opening 112, and/or third opening 113. When the speed of the blown air in duct 12 exceeds a predetermined value, additional air from the passenger compartment is admitted to duct 12 through second passenger compartment air intake 20 and joins the above-described air flow. Thus, air from the passenger compartment may be admitted to duct 12 even if first damper 16 is positioned to admit only outside air.

The circulation of air from the passenger compartment through duct 12 is not always desired. For example, it is sometimes desirable to heat the passenger compartment utilizing only outside air so as to provide fresh air and comfortable ventilation to the passenger compartment. Thus, both first air intake 15 and second air intake 20 should be closed, i.e., only outside air should be admitted to duct 12. However, in the above-described prior art system, second air intake 20 cannot be forced to remain closed since second damper 21 is a dead load type damper. Accordingly, heating of the passenger compartment with comfortable ventilation and fresh, outside air is obtained ineffectively.

SUMMARY OF THE INVENTION

Accordingly, it is an object of the present invention to provide an air intake for an automotive air conditioning system which effectively controls the circulation of outside air and air from the passenger compartment in response to air conditioning demand.

In accordance with the present invention, an air conditioning system for controlling the temperature in a passenger compartment of an automobile is provided. The air conditioning system includes a duct which defines an air passage and a blower disposed in the air passage for blowing air through the air passage. An outside air intake is formed in the duct for admitting air from outside the passenger compartment to the duct. First and second passenger compartment air intakes are formed in the duct for admitting air from the passenger compartment to the duct. A first damper selectively opens and closes the outside air intake and the first passenger compartment air intake in response to temperature control signals. A second damper opens and closes the second passenger compartment air intake in response to the speed of the blown air in the air passage. A damper control mechanism selectively controls the second damper such that the second passenger compartment air intake remains closed regardless of the speed of the blown air in the air passage.

BRIEF DESCRIPTION OF THE DRAWINGS

A more complete appreciation of the present invention and many of the attendant advantages thereof will be readily obtained as the invention becomes better understood by reference to the following detailed description when considered in connection with the accompanying drawings.

DETAILED DESCRIPTION OF THE PREFERRED EMBODIMENT

Figure 1:
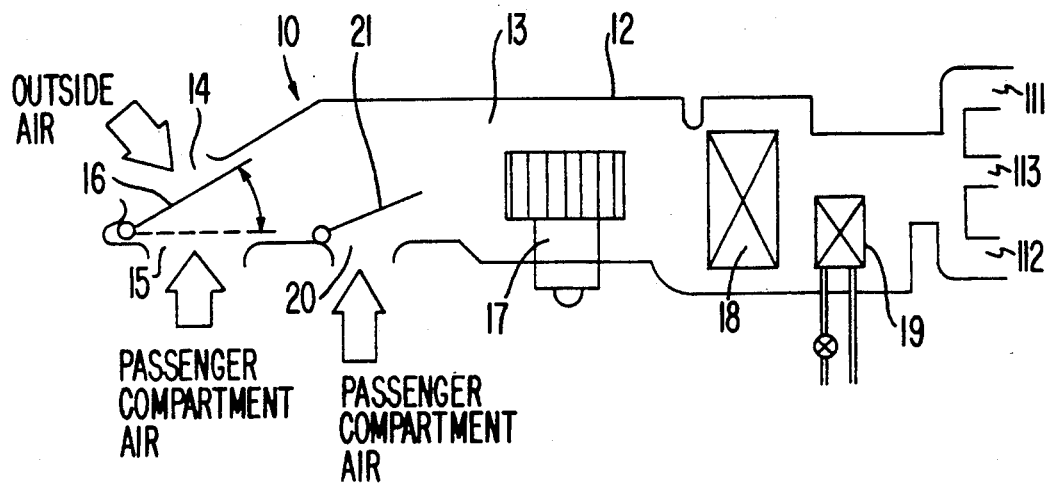
FIG. 1 is a diagrammatical vertical sectional view of a duct portion of an automotive air conditioning system in according with a prior art.
Figure 2:
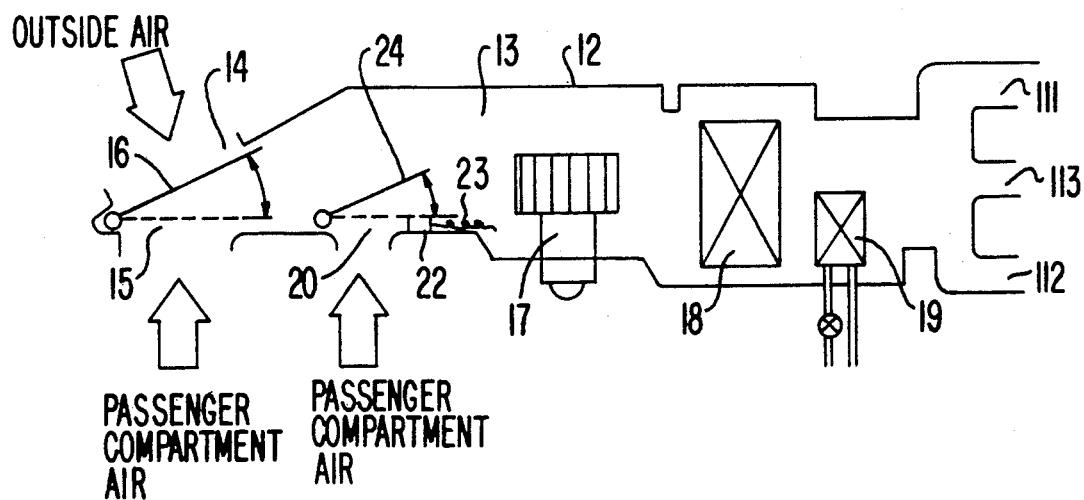
FIG. 2 is a diagrammatical vertical sectional view of a duct portion of an automotive air conditioning system in accordance with an embodiment of the present invention.

FIG. 2 illustrates an embodiment of the present invention. The same numerals are used to denote elements corresponding to those elements shown in FIG. 1. In the embodiment of FIG. 2, electromagnet 22 is secured to duct 12 at an inner edge of second air intake 20. Wire 23 is coupled to electromagnet 22 and provide a signal corresponding to air conditioning demand as determined, for example, by the positioning of temperature control switches by a passenger in the automobile. At least a portion of second damper 24 which faces electromagnet 22 is made of a magnetic material such as iron so as to be attracted when electromagnet 22 is switched on or excited.

Figure 3:
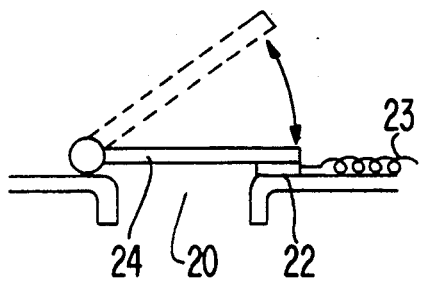
FIG. 3 is a an enlarged schematic view of a second damper portion illustrated in FIG. 2.

With reference to FIG. 3, when electromagnet 22 is switched on by a first signal provided by wire 23, second damper 24 is attracted to electromagnet 22 and closes second air intake 20. However, when electromagnet 22 is demagnetized or switched off by a second signal provided by wire 23, second damper 24 opens and closes second air intake 20 in response to the speed of blown air in duct 21 while blower 17 is operated.

Figure 4:
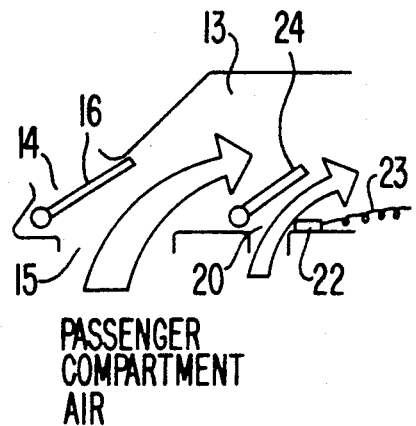
FIGS. 4, 5 and 6 are enlarged schematic views of both first and second damper portions illustrated in FIG. 2.

FIG. 4 illustrates damper positioning for cooling the passenger compartment when the outside temperature is high, for example, on a summer day. First damper 16 closes outside air intake 14 thereby opening first air intake 15. At the same time, electromagnet 22 is demagnetized or switched off and second damper 24 is therefore responsive to the speed of the blown air in air passage 13. Thus, when blower 17 is operated, air from the passenger compartment of the automobile is taken into duct 12 through first air intake 15 and flows to the rear of duct 12. When the speed of the blown air in air passage 13 exceeds a predetermined value, second air intake 20 is opened and an increased volume of air from the passenger compartment is taken into duct 12 and flows to the rear of duct 12. Effective cooling is generated by the increased amount of circulating passenger compartment air.

Figure 5:
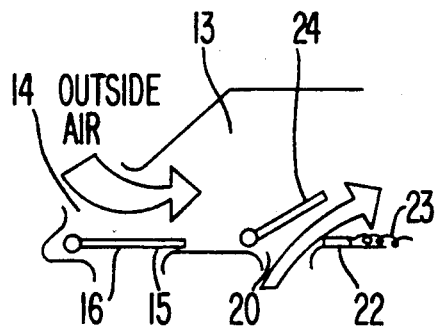

FIG. 5 illustrates damper positioning for heating the passenger compartment when the outside temperature is low, for example, on a winter day. First damper 16 closes first air intake 15, thereby opening outside air intake 14. At the same time, electromagnet 22 is demagnetized or switched off and second damper 24 is therefore responsive to the speed of the blown air in air passage 13. Thus, when blower 17 is operated, outside air is taken into duct 12 through air intake 14 and flows to the rear of duct 12. When the speed of blown air in duct 12 exceeds a predetermined value, second air intake 20 is opened and air from the passenger compartment is taken into duct 12 and flows to the rear of duct 12. Effective heating is generated by the circulating passenger compartment air.

Figure 6:
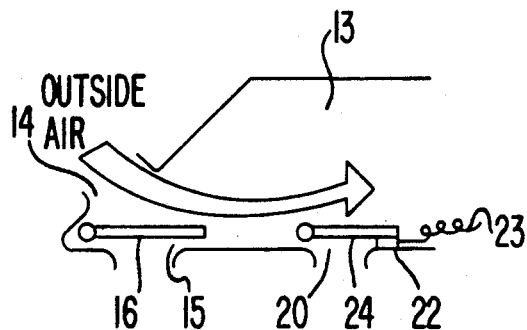

FIG. 6 illustrates damper positioning for heating the passenger compartment when the outside temperature is low, for example, on a winter day, and which utilizes only fresh outside air for heating. First damper 16 closes first passenger compartment air intake 15, thereby opening outside air intake 14. At the same time, electromagnet 22 is switched on or excited. Thus, when blower 17 is operated, outside air is taken into duct 12 through outside air intake 14 and flows to the rear of duct 12. However, air from the passenger compartment is not taken into duct 12 because both first air intake 15 and second air intake 20 remain closed. The attractive force of electromagnet 22 on a second damper 24 is greater than the force on second damper 24 due to the blown air and thus second air intake 20 remains closed. Accordingly, the passenger compartment may be heated and effective ventilation with outside air may be obtained.

This invention has been described in detail in connection with the preferred embodiment. This embodiment, however, are merely for examply only and the invention is not restricted thereto. It will be understood by those skilled in the art that the variations and modifications can easily be made within the scope of this invention as defined by the claims.

We claim:

1. In an air conditioning system for controlling the temperature in a passenger compartment of an automobile, said air conditioning system including a duct which defines an air passage, blower means disposed in said air passage for blowing air at various speeds through said air passage, an outside air intake formed in said duct for admitting air from outside said passenger compartment to said duct, first and second passenger compartment air intakes formed in said duct for admitting air from said passenger compartment to said duct, first damper means for selectively opening and closing said outside air intake and said first passenger compartment air intake in response to temperature control signals, and second damper means for opening and closing said second passenger compartment air intake in response to the speed of the blown air in said air passage, an improvement comprising:

damper control means for selectively controlling said second damper means independently of the speed of the blown air in said air passage, said damper control means including an electromagnet positioned adjacent said second passenger compartment air intake and wherein at least a portion of said second damper means comprises a magnetic material such that said second damper means is selectively attracted to said electromagnet in response to temperature control signals.

2. A method of controlling the intake of air in an air conditioning system for controlling the temperature in a passenger compartment of an automobile, said air conditioning system including a duct which defines an air passage, blower means disposed in said air passage for blowing air at various speeds through said air passage, an outside air intake formed in said duct for admitting air from outside said passenger compartment to said duct, first and second passenger compartment air intakes formed in said duct for admitting air from said passenger compartment to said duct, first damper means for selectively opening and closing said outside air intake and said first passenger compartment air intake in response to temperature control signals, and second damper means for opening and closing said second passenger compartment air intake in response to the speed of the blown air in said air passage, said method including the steps of:

selectively controlling said first damper means in response to the temperature control signals; and
  selectively controlling said second damper means independently of the speed of the blown air in said air passage.

3. An air intake assembly for an air conditioning system which controls the temperature in a passenger compartment of an automobile, said air intake assembly comprising:

a duct which defines an air passage;

blower means disposed in said air passage for blowing air at various speeds through said air passage;

an outside air intake formed in said duct for admitting air from outside said passenger compartment to said duct;

first and second passenger compartment air intakes formed in said duct for admitting air from said passenger compartment to said duct;

first damper means for selectively opening and closing said outside air intake and said first passenger compartment air intake in response to temperature control signals, second damper means for opening and closing said second passenger compartment air intake in response to the speed of the blown air in said air passage; and damper control means for selectively controlling said second damper means independently of the speed of the blown air in said air passage.

4. The air intake assembly according to claim 3 wherein said damper control means comprises an electromagnet positioned adjacent said second passenger compartment air intake and wherein at least a portion of said second damper means comprises a magnetic material.

5. An air conditioning system for controlling the temperature in a passenger compartment of an automobile, said air conditioning system comprising:
a duct which defines an air passage;
blower means disposed in said air passage for blowing air at various speeds through said air passage;
an outside air intake formed in said duct for admitting air from outside said passenger compartment to said duct;
first and second passenger compartment air intakes formed in said duct for admitting air from said passenger compartment to said duct;
first damper means for selectively opening and closing said outside air intake and said first passenger compartment air intake in response to temperature control signals;
second damper means for opening and closing said second passenger compartment air intake, at least a portion of said second damper means comprising a magnetic material; and damper control means for selectively controlling said second damper means, said damper control means comprising an electromagnet positioned adjacent said second passenger compartment air intake such that said second damper means is selectively attracted to said electromagnet in response to temperature control signals.

6. The air conditioning system according to claim 5 further comprising: evaporator means for cooling the blown air in said air passage.

7. The air conditioning system according to claim 5 further comprising: heater means for heating the blown air in said air passage.

8. An air intake assembly for an air conditioning system which controls the temperature in a passenger compartment of an automobile, said air intake assembly comprising;
a duct which defines an air passage;
blower means disposed in said air passage for blowing air at various speeds through said air passage;
an outside air intake formed in said duct for admitting air from outside and passenger compartment to said duct;
first and second passenger compartment air intakes formed in said duct for admitting air from said passenger compartment to said duct;
first damper means for selectively opening and closing said outside air intake and said first passenger compartment air intake in response to temperature control signals;
second damper means for opening and closing said second passenger compartment air intake; and
damper control means responsive to control signals for controlling said second damper means, said damper control means including means for selectively controlling said second damper to close said second passenger compartment air intake independently of a state of said blower means and said first damper means.

9. The air intake assembly according to claim 8 wherein said damper control means comprises an electromagnet positioned adjacent to said second passenger compartment air intake and wherein at least a portion of said second damper means comprises a magnetic material.

* * * * *

UNITED STATES PATENT AND TRADEMARK OFFICE
CERTIFICATE OF CORRECTION

PATENT NO.  : 5,048,399

DATED       : September 17, 1991

INVENTOR(S) : Toshihiko Fujita et al.

It is certified that error appears in the above-identified patent and that said Letters Patent is hereby corrected as shown below: On Title Page:

Face of Patent, Section [19], delete "Toshihiko" and insert --Fujita--;

Face of Patent, Section [75], Inventors: delete in its entirety and insert --Toshihiko Fujita, Isesaki; Takeharu Nakazawa, Tamamura, both of Japan--;

Col. 1, line 40, delete "of" and insert --or--;

Col. 1, line 60, delete "the" (second occurrence) and insert --The--;

Col. 1, line 61, delete "evaporation" and insert --evaporator--;

Col. 1, line 64, delete "ll" and insert --lll--;

Col. 2, line 58, delete "according" and insert --accordance--;

Col. 2, line 64, delete "a" (first occurrence);

Col. 3, line 9, delete "provide" and insert --provides--;

Col. 4, line 8, delete "are" and insert --is--;

Col. 4, line 8, delete "examply" and insert --example--

Col. 6, line 22, claim 8, delete "and" and insert --said--.

Signed and Sealed this

Fifth Day of January, 1993

*Attest:*

DOUGLAS B. COMER

*Attesting Officer*

*Acting Commissioner of Patents and Trademarks*